United States Patent
Hellman et al.

(10) Patent No.: US 9,432,688 B2
(45) Date of Patent: Aug. 30, 2016

(54) PARALLEL SYMBOL DECODING

(71) Applicant: BROADCOM CORPORATION, Irvine, CA (US)

(72) Inventors: Timothy Moore Hellman, Concord, MA (US); Nirmala Paul, Chelmsford, MA (US); Stephen Michael Thompson, Acton, MA (US)

(73) Assignee: Broadcom Corporation, Irvine, CA (US)

( * ) Notice: Subject to any disclaimer, the term of this patent is extended or adjusted under 35 U.S.C. 154(b) by 320 days.

(21) Appl. No.: 14/028,455

(22) Filed: Sep. 16, 2013

(65) Prior Publication Data

US 2015/0055708 A1    Feb. 26, 2015

Related U.S. Application Data (60) Provisional application No. 61/870,193, filed on Aug. 26, 2013.

(51) Int. Cl.

| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/52* | (2014.01) |

(Continued)

(52) U.S. Cl.
CPC ............ *H04N 19/52* (2014.11); *H04N 19/13* (2014.11); *H04N 19/1887* (2014.11); *H04N 19/436* (2014.11); *H04N 19/44* (2014.11); *H04N 19/46* (2014.11)

(58) Field of Classification Search
None
See application file for complete search history.

(56) References Cited

U.S. PATENT DOCUMENTS 6,466,624 B1 * 10/2002 Fogg ................. H04N 19/46 375/240.12
2004/0240743 A1 * 12/2004 Hamada ............. H04N 19/51 382/233

(Continued)

OTHER PUBLICATIONS

"Image Processing—Context-Based Adaptive Binary Arithmetic Coding (CABAC)", Fraunhofer Heinrich-Hertz-Institut, retrieved from <www.hhi.fraunhofer.de/de/kompetenzfelder/image-processing/research-groups/image-video-coding/statistical-modeling-coding/context-based-adaptive-binary . . . > on Jul. 19, 2013, pp. 1-3.

(Continued)

*Primary Examiner* — Joseph Ustaris
*Assistant Examiner* — Rebecca Volentine
(74) *Attorney, Agent, or Firm* — McDermott Will & Emery LLP (57) ABSTRACT

A device for parallel symbol decoding may include a first and second block. The first block is configured to convert a bitstream into a stream of binary symbols corresponding to motion vector data and other compressed image data, insert length fields into the stream of binary symbols that are each indicative of a number of consecutive binary symbols that correspond to motion vector data, and store the stream of binary symbols in a buffer. The second block is configured to retrieve the stream of binary symbols from the buffer, determine, based at least in part on the inserted length fields, consecutive binary symbols that correspond to motion vector data, decode the consecutive binary symbols that correspond to motion vector data via a first decode path, and to decode binary symbols that correspond to other compressed image data via a second decode path that is independent of the first decode path.

20 Claims, 9 Drawing Sheets

(51) Int. Cl.
*H04N 19/13* (2014.01)
*H04N 19/44* (2014.01)
*H04N 19/436* (2014.01)
*H04N 19/169* (2014.01)
*H04N 19/46* (2014.01)

(56) References Cited

U.S. PATENT DOCUMENTS

| | | | | |
|---|---|---|---|---|
| 2006/0109912 A1* | 5/2006 | Winger | ............... | H04B 1/66 375/240.23 |
| 2011/0248872 A1* | 10/2011 | Korodi | ............... | H03M 7/40 341/67 |
| 2011/0254712 A1* | 10/2011 | He | ............... | H03M 7/40 341/87 |
| 2012/0121024 A1* | 5/2012 | Lee | ............... | H04N 19/13 375/240.26 |
| 2012/0207213 A1* | 8/2012 | Amon | ............... | H04N 19/13 375/240.08 |
| 2012/0269448 A1* | 10/2012 | Kimura | ............... | H04N 19/60 382/233 |
| 2013/0114686 A1 | 5/2013 | Misra et al. | | |

OTHER PUBLICATIONS

Sullivan, et al., "Overview of the High Efficiency Video Coding (HEVC) Standard", IEEE Transactions on Circuits and Systems for Video Technology, Dec. 2012, pp. 1649-1668, vol. 22, No. 12.

* cited by examiner

PARALLEL SYMBOL DECODING

CROSS-REFERENCE TO RELATED APPLICATIONS

The present application claims the benefit of U.S. Provisional Patent Application Ser. No. 61/870,193, entitled "Parallel Symbol Decoding," filed on Aug. 26, 2013, which is hereby incorporated by reference in its entirety for all purposes.

TECHNICAL FIELD

The present description relates generally to symbol decoding, and more particularly, but not exclusively, to parallel symbol decoding in a decoder.

BACKGROUND

The introduction of high resolution 4 k and 8 k Ultra-HD video displays has led to a demand for 4 k and 8 k Ultra-HD content. However, the bit rate of uncompressed 4 k and 8 k Ultra-HD video streams is significantly higher than the bit rate of uncompressed HD video streams, e.g. up to eight times higher, which may render some existing video compression/encoding standards unsuitable for 4 k and 8 k Ultra-HD video streams. As such, additional video compression standards, such as the High Efficiency Video Coding (HEVC) Standard, have been developed for use with high resolution video streams, e.g., 4 k and 8 k Ultra-HD video streams. In the HEVC Standard, an encoded bitstream includes a series of arithmetic-coded symbols that correspond to elements of a compressed image, such as spatial prediction modes, motion vector data, transform coefficients, etc. The elements are combined into coding units (CUs) that correspond to square pixel regions of the coded image.

A video decoder implementing the HEVC Standard, e.g. an HEVC decoder, receives the bitstream that includes HEVC coding units and passes the bitstream through a Context Adaptive Binary Arithmetic Coder (CABAC) block. The CABAC block converts the coding units of the bitstream into a stream of binary symbols ("bins") and stores the binary symbols in a memory buffer. A symbol decoder of the HEVC decoder retrieves the binary symbols from the memory buffer and decodes the binary symbols into the symbols that correspond to the elements of the compressed image, such as spatial prediction mode symbols, motion vector symbols and/or transform coefficient symbols. The symbols that correspond to the elements of the compressed image are passed to appropriate blocks for generating the corresponding elements, e.g. spatial prediction modes, motion vectors, transform coefficients, etc. However, since the symbols that correspond to the elements may be of varying lengths that are unknown to the symbol decoder, the symbol decoder may need to decode the binary symbols in serial fashion. The serial operation of the symbol decoder may limit the overall decoding performance of the HEVC decoder, which may require that the HEVC decoder operate at a very high frequency to decode high resolution video streams, e.g. 4 k or 8 k Ultra-HD video streams.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for parallel symbol decoding, the CABAC block of a decoder inserts information, such as length fields, into the stream of binary symbols that is being stored in the memory buffer. The inserted length field provides the symbol decoder with the lengths of one or more of the elements encoded by the binary symbols, which enables the symbol decoder to decode multiple binary symbols in parallel. The parallel symbol decoding by the symbol decoder increases the performance and efficiency of the decoding process and thereby facilitates the decoding of high resolution video streams, e.g. 4 k or 8 k Ultra-HD video streams.

Figure 1:
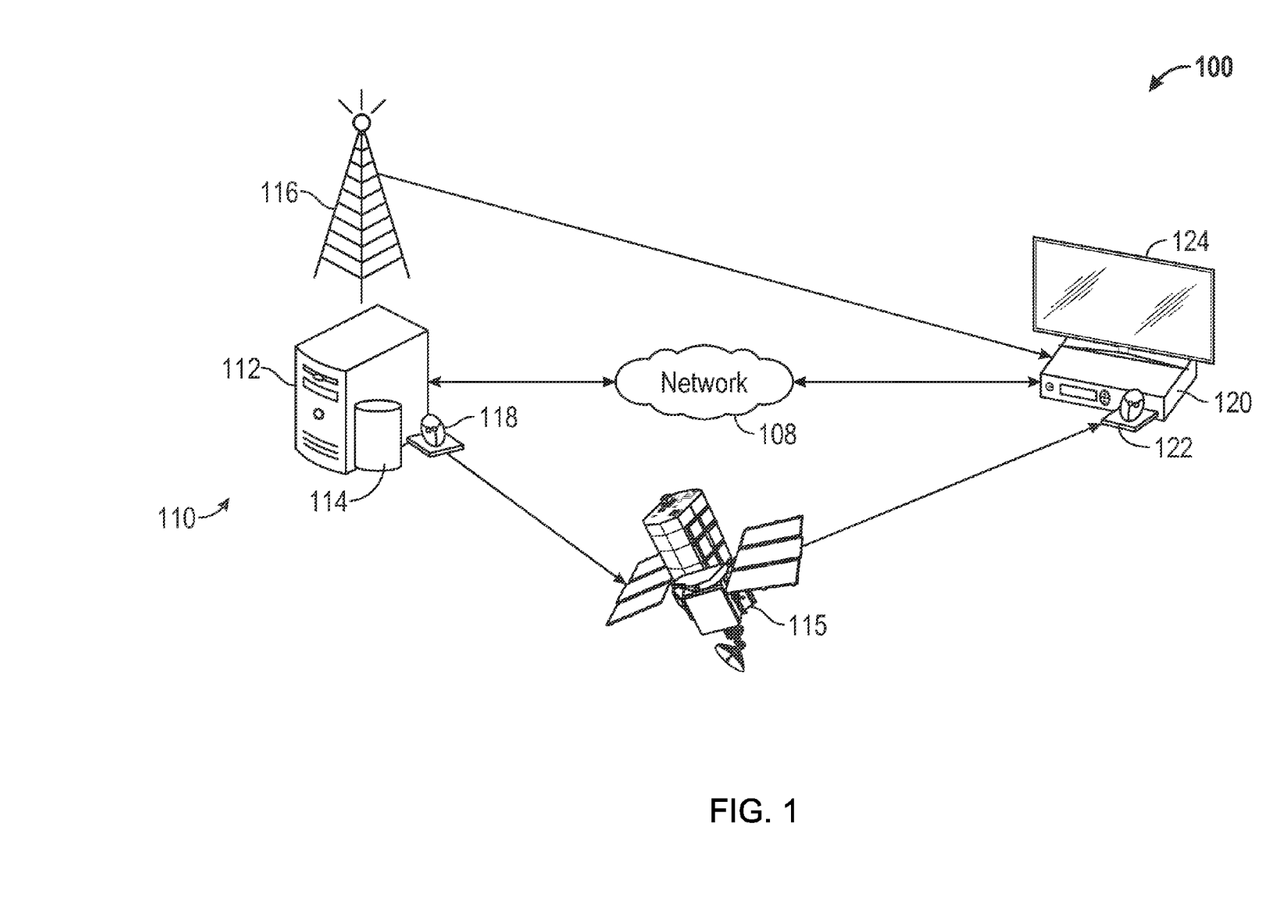
FIG. 1 illustrates an example network environment in which parallel symbol decoding may be implemented in accordance with one or more implementations.

FIG. 1 illustrates an example network environment 100 in which parallel symbol decoding may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to an electronic device 120, such as by a network 108. The CDN 110 may include, and/or may be communicably coupled to, a content server 112 for transmitting encoded data streams, such as HEVC encoded video streams, over the network 108, an antenna 116 for transmitting encoded data streams over the air, and a satellite transmitting device 118 for transmitting encoded data streams to a satellite 115. The electronic device 120 may include, and/or may be coupled to, a satellite receiving device 122, such as a satellite dish, that receives encoded data streams from the satellite 115. In one or more implementations, the electronic device 120 may further include an antenna for receiving encoded data streams, such as HEVC encoded video streams, over the air from the antenna 116 of the CDN 110. The content server 112 and/or the electronic device 120, may be, or may include, one or more components of the electronic system discussed below with respect to FIG. 8.

The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like. In one or more implementations, the network 108 may include transmission lines, such as coaxial transmission lines, fiber optic transmission lines, or generally any transmission lines, that communicatively couple the content server 112 and the electronic device 120.

The content server 112 may include, or may be coupled to, one or more processing devices, a data store 114, and/or an encoder. The one or more processing devices execute computer instructions stored in the data store 114, for example, to implement a content delivery network. The data store 114 may store the computer instructions on a non-transitory computer-readable medium. The data store 114 may further store one or more programs, e.g. video and/or audio streams, that are delivered by the CDN 110. The encoder may use a codec to encode video streams, such as an HEVC codec or any other suitable codec. In one or more implementations, the content server 112 may be a single computing device such as a computer server. Alternatively, the content server 112 may represent multiple computing devices that are working together to perform the actions of a server computer (such as a cloud of computers and/or a distributed system). The content server 112 may be coupled with various databases, storage services, or other computing devices, such as an adaptive bit rate (ABR) server, that may be collocated with the content server 112 or may be disparately located from the content server 112.

The electronic device 120 may include, or may be coupled to, one or more processing devices, a memory, and/or a decoder, such as a hardware decoder. The electronic device 120 may be any device that is capable of decoding an encoded data stream, such as an HEVC encoded video stream. In one or more implementations, the electronic device 120 may be, or may include all or part of, a laptop or desktop computer, a smartphone, a personal digital assistant ("PDA"), a portable media player, a tablet computer, a wearable electronic device, such as a pair of glasses or a watch with one or more processors coupled thereto and/or embedded therein, a set-top box, a television or other display with one or more processors coupled thereto and/or embedded therein, or other appropriate electronic devices that can be used to decode an encoded data stream, such as an encoded HEVC video stream.

In FIG. 1, the electronic device 120 is depicted as a set-top box, e.g. a device that is coupled to, and is capable of displaying video content on, a display 124, such as a television, a monitor, or any device capable of displaying video content. In one or more implementations, the electronic device 120 may be integrated into the display 124 and/or the display 124 may be capable of outputting audio content in addition to video content. The electronic device 120 may receive streams from the CDN 110, such as encoded data streams, that include content items, such as television programs, movies, or generally any content items. The electronic device 120 may receive the encoded data streams from the CDN 110 via the antenna 116, via the network 108, and/or via the satellite 115, and decode the encoded data streams, e.g. using the hardware decoder. An example electronic device 120 is discussed further below with respect to FIG. 2.

Figure 2:
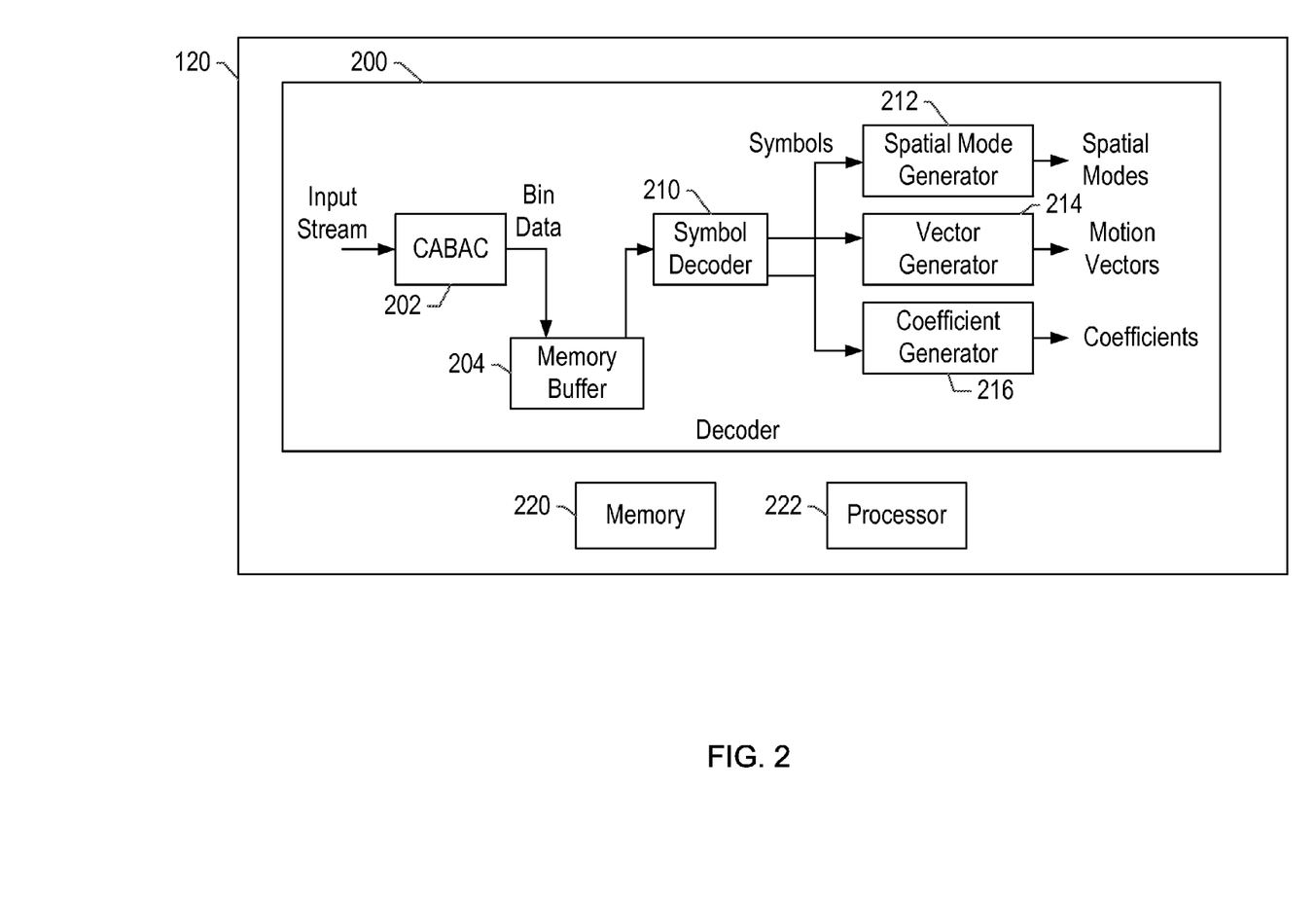
FIG. 2 illustrates an example electronic device that may implement parallel symbol decoding in accordance with one or more implementations.

FIG. 2 illustrates an example electronic device 120 that may implement parallel symbol decoding in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The electronic device 120 includes a decoder 200, a memory 220, and one or more processors 222. The decoder 200 includes a CABAC block 202, a memory buffer 204, a symbol decoder 210, a spatial mode generator 212, a vector generator 214, and a coefficient generator 216. In one or more implementations, any of the CABAC block 202, a memory buffer 204, a symbol decoder 210, a spatial mode generator 212, a vector generator 214, and a coefficient generator 216 may be referred to as a decoder block.

In the subject system for parallel symbol decoding, the electronic device 120 receives a bitstream that includes an encoded video stream, such as a video stream encoded using an HEVC codec. The electronic device 120 passes the bitstream to the CABAC block 202 of the decoder 200. In one or more implementations, the bitstream may be organized in a format that is associated with the codec used to encode the bitstream, such as the HEVC codec. The CABAC block 202 may parse the bitstream based on the format associated with the codec. An example process for parsing a bitstream, e.g. based on the HEVC codec, is discussed further below with respect to FIG. 8.

The CABAC block 202 parses the bitstream and converts the bitstream into a stream of binary symbols that are stored in the memory buffer 204. However, when the CABAC block 202 identifies a binary symbol that corresponds to the start of motion vector data, e.g. based on the determined or known organization or format of the bitstream, the CABAC block 202 buffers the binary symbol, and subsequent consecutive binary symbols that include motion vector data, in an on-chip buffer, or an internal buffer. The CABAC block 202 also leaves space in the on-chip buffer before the binary symbol for a fixed-sized length field, such as a ten bit field. In one or more implementations, the length of the motion vector data may be bounded, e.g. less than 1024 bits, thus limiting the amount of on-chip buffer space required by the CABAC block 202. The CABAC block 202 continues to convert the bitstream into binary symbols, and buffer the binary symbols in the on-chip buffer, until the CABAC block 202 identifies a binary symbol that corresponds to the end of the motion vector data. For example, the CABAC block 202 may identify the last binary symbol that corresponds to motion vector data or the first binary symbol that corresponds to the next compressed image data, such as transform coefficient data.

Upon identifying the binary symbol that corresponds to the end of the motion vector data, the CABAC block 202 determines the length of the motion vector data, e.g. based on the number of binary symbols stored in the on-chip buffer. The CABAC block 202 inserts the length of the motion vector data into the previously reserved space for the length field, and writes all of the internally buffered data, e.g. the length field and the binary symbols, to the memory buffer 204. An example format of the stream of binary symbols, including an inserted length field, is discussed further below with respect to FIG. 6. The CABAC block 202 may continue to convert the bitstream into the stream of binary symbols and insert length fields before consecutive binary symbols that include motion vector data, e.g. until the entirety of the bitstream has been converted. An example process of the CABAC block 202 is discussed further below with respect to FIG. 4.

The symbol decoder 210 may subsequently retrieve the symbols from the memory buffer 204 and utilize the inserted length field as a pointer to the end of the binary symbols that include the motion vector data and, consequently, the start of the binary symbols that include the next compressed image data, e.g. transform coefficient data. Thus, the symbol decoder 210 may decode the binary symbols that include the motion vector data (and provide the motion vector data to the vector generator 214) and in parallel with decoding the binary symbols that include other compressed image data (and providing the other compressed image data to the spatial mode generator 212 or the coefficient generator 216). Example components of the symbol decoder 210 are discussed further below with respect to FIG. 3, and an example process of the symbol decoder 210 is discussed further below with respect to FIG. 5.

Since the symbol decoder 210 can extract and decode the binary symbols that include motion vector data in parallel with, e.g. at substantially the same time as, binary symbols that include other compressed image data, such as spatial mode data, transform coefficient data, etc. time required for decoding the compressed image data can be significantly reduced. An example timeline illustrating the reduction in decoding time achieved by parallel symbol decoding as compared to serial symbol decoding is discussed further below with respect to FIG. 7.

Figure 3:
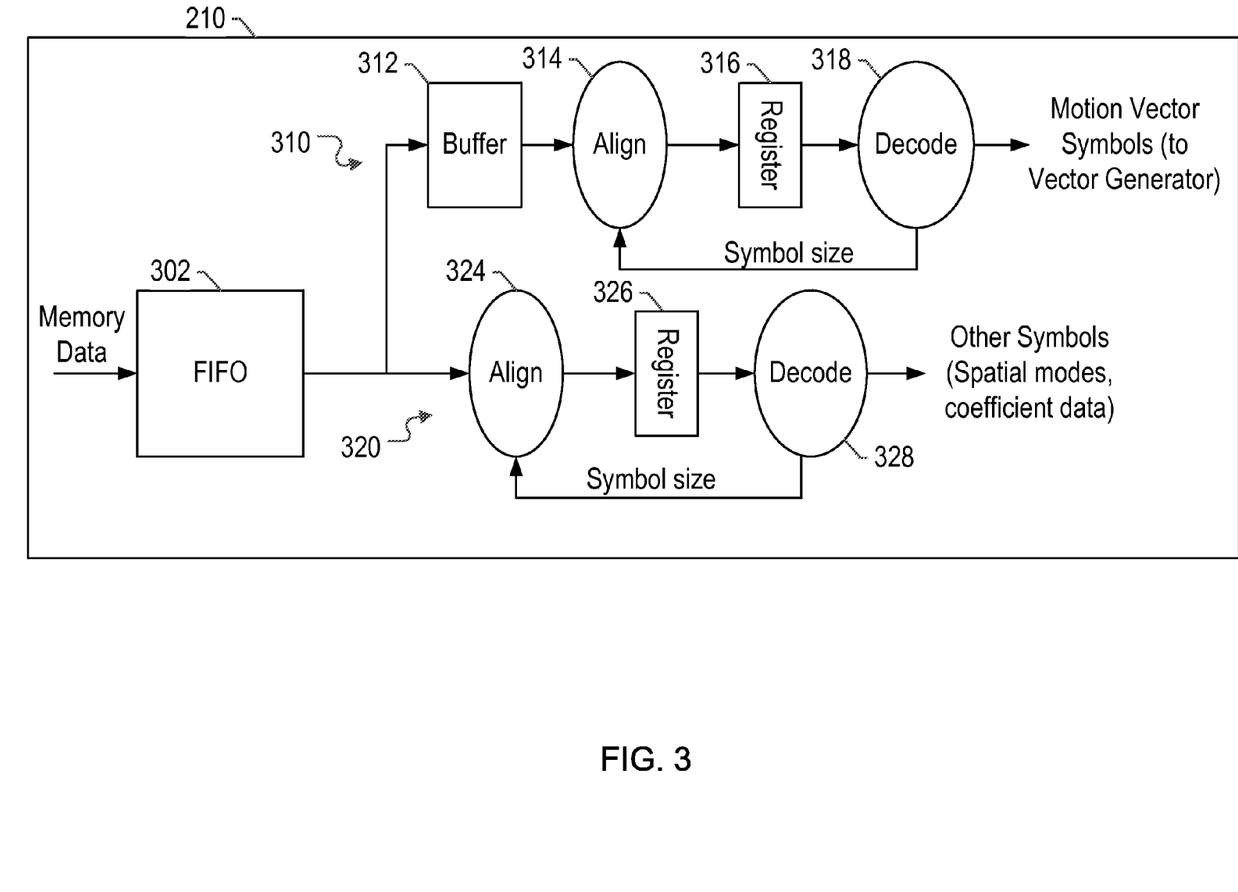
FIG. 3 illustrates an example symbol decoder that may perform parallel symbol decoding in accordance with one or more implementations.

FIG. 3 illustrates an example symbol decoder 210 that may perform parallel symbol decoding in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The symbol decoder 210 includes a first in first out (FIFO) memory 302, a first decode path 310, and a second decode path 320. The first decode path 310 decodes binary symbols corresponding to motion vector data and provides the decoded motion vector data to the vector generator 214. The first decode path 310 includes a buffer 312, a first alignment block 314, a register 316, and a first decode block 318. The second decode path 320 decodes binary symbols corresponding to other compressed image data, such as spatial mode data, transform coefficient data, etc., provides decoded spatial mode data to the spatial mode generator 212 and provides decoded transform coefficient data to the coefficient generator 216. The second decode path 320 includes a second alignment block 324, a register 326, and a second decode block 328. In one or more implementations, the first decode path 310 may be physically separate and distinct from the second decode path 320.

In operation, the symbol decoder 210 may retrieve the binary symbol stream from the memory buffer 204 and may store the binary symbol stream in the FIFO memory 302. The symbol decoder 210 may retrieve the binary symbol stream from the FIFO memory 302 and pass the binary symbol stream to the second decode path 320, until the symbol decoder 210 identifies a length field in the binary symbol stream. When the symbol decoder 210 identifies a length field in the binary symbol stream, e.g. indicating that a subsequent number of consecutive symbols correspond to motion vector data, the symbol decoder 210 extracts the number of consecutive binary symbols from the stream indicated by the length field, and passes the extracted binary symbols to the first decode path 310. Thus, the symbol decoder 210 passes the extracted binary symbols that correspond to motion vector data to the first decode path 310 rather than the second decode path 320.

The buffer 312 of the first decode path 310 buffers received binary symbols, e.g. when the pipeline of the first decode path 310 is full. The first alignment block 314 performs alignment for the binary symbols retrieved from the buffer 312, such as based on a bit position. The binary symbols are stored in the register 316 from which they are retrieved by the first decode block 318. The first decode block 318 performs a symbol decode, e.g. a table look-up, which determines both the symbol value and the size of the symbol in bits. The first decode block 318 provides the size of the symbol in bits to the first alignment block 314 which updates the bit position for the binary symbols being retrieved from the buffer 312. The decoded binary symbols are then provided to the vector generator 214.

The second alignment block 324 retrieves binary symbols directly from the FIFO memory 302. The second alignment block 324 performs alignment for the binary symbols retrieved from the FIFO memory 302, such as based on a bit position. The binary symbols are stored in the register 326 from which they are retrieved by the second decode block 328. The second decode block 328 performs a symbol decode, e.g. a table look-up, which determines both the symbol value and the size of the symbol in bits. The second decode block 328 provides the size of the symbol in bits to the second alignment block 324 which updates the bit position for the binary symbols being retrieved from the FIFO memory 302. The decoded binary symbols are then provided to the spatial mode generator 212, in the case of spatial mode data, or the coefficient generator 216, in the case of transform coefficient data.

Figure 4:
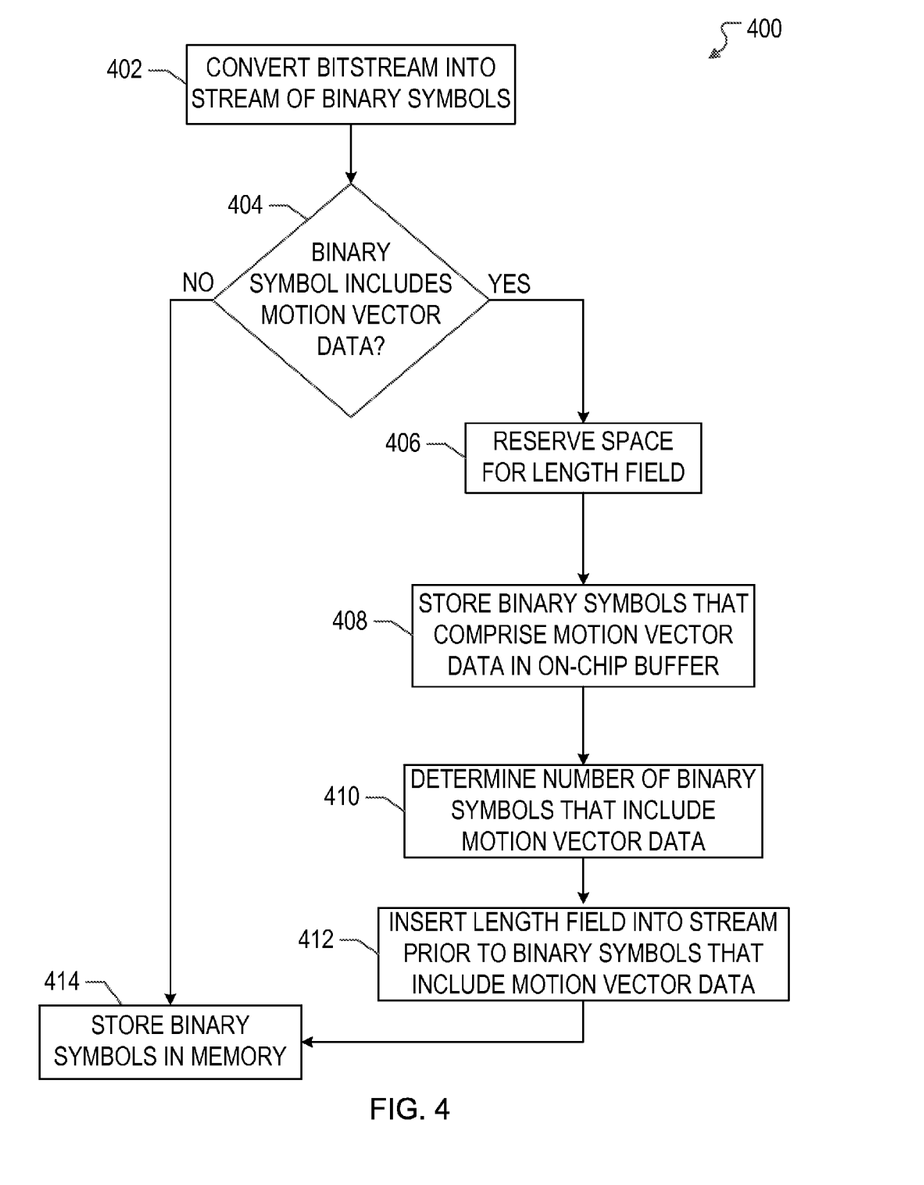
FIG. 4 illustrates a flow diagram of an example process of a first decoder block of a decoder in accordance with one or more implementations.

FIG. 4 illustrates a flow diagram of an example process 400 of a first decoder block of a decoder 200 in accordance with one or more implementations. For explanatory purposes, the example process 400 is described herein with reference to the CABAC block 202 of FIG. 2; however, the example process 400 is not limited to the CABAC block 202 of FIG. 2, and the example process 400 may be performed by one or more other components of the decoder 200. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

The CABAC block 202 converts an encoded bitstream into a stream of binary symbols (402), e.g. based at least in part on a CABAC encoding associated with the codec used to encode the bitstream. As the CABAC block 202 is converting the encoded bitstream into the stream of binary symbols (402), the CABAC block 202 determines whether a converted binary symbol includes motion vector data (404), e.g. based on the organization of the bitstream associated with the codec used to encode the bitstream. If the CABAC block 202 determines that the binary symbol does not include motion vector data (404), the CABAC block 202 stores the binary symbol in the memory buffer 204 (414).

If the CABAC block 202 determines that the binary symbol includes motion vector data (404), the CABAC block 202 reserves space in an on-chip buffer for a length field (406), and stores the subsequent consecutive binary symbols that include motion vector data in the on-chip buffer (408). Once the subsequent consecutive binary symbols that include motion vector data have been stored in the on-chip buffer, e.g. when a binary symbol that does not include motion vector data is identified by the CABAC block 202, the CABAC block 202 determines the number of the consecutive binary symbols that include motion vector data (410), such as by determining the number of binary symbols stored in the on-chip buffer. The CABAC block 202 inserts the determined number of the consecutive binary symbols into the space reserved in the on-chip buffer for the length field (412). The CABAC block 202 then retrieves the inserted length field and the binary symbols from the on-chip buffer and stores the inserted length field and the binary symbols in the memory buffer 204 (414).

Figure 5:
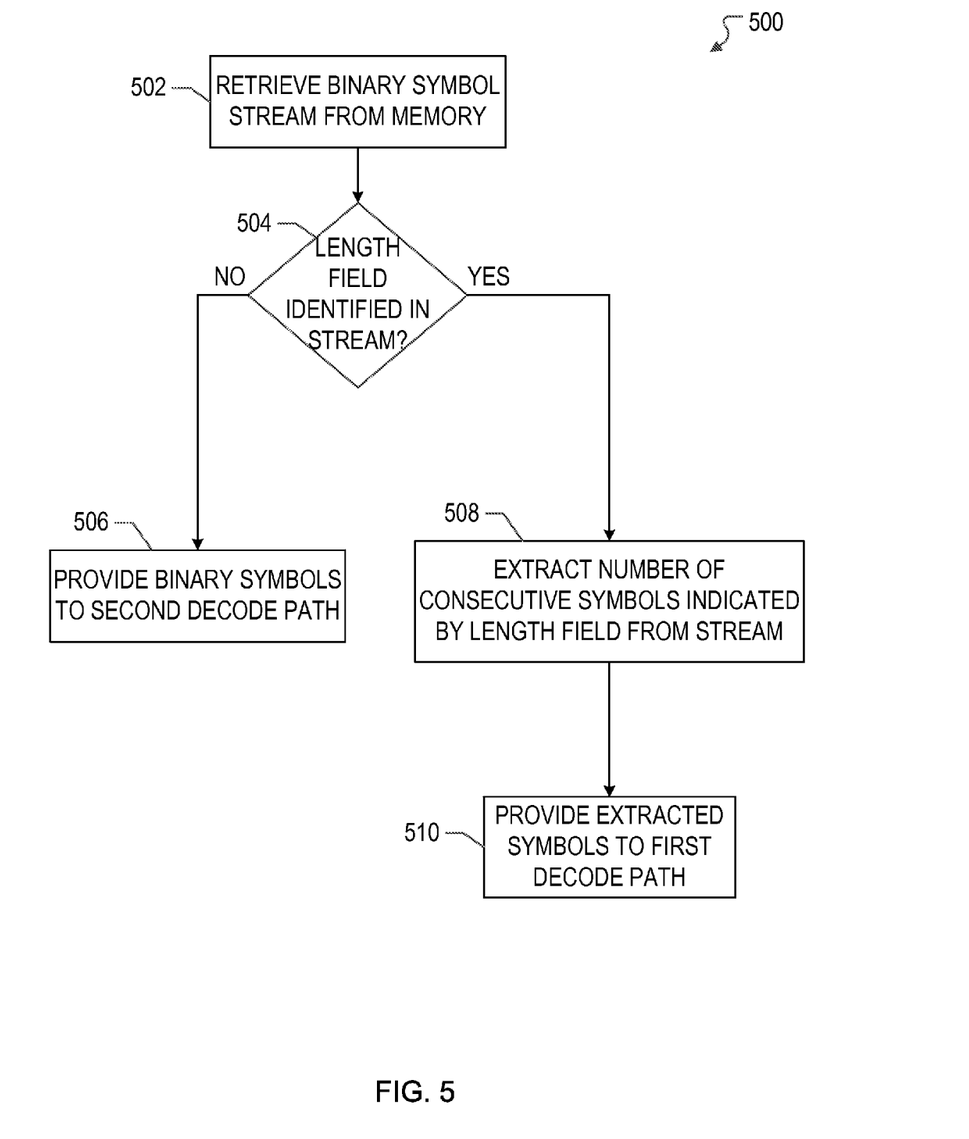
FIG. 5 illustrates a flow diagram of an example process of a second decoder block of a decoder in accordance with one or more implementations.

FIG. 5 illustrates a flow diagram of an example process 500 of a second decoder block of a decoder 200 in accordance with one or more implementations. For explanatory purposes, the example process 500 is described herein with reference to the symbol decoder 210 of FIGS. 2 and 3; however, the example process 500 is not limited to the symbol decoder 210 of FIGS. 2 and 3, and the example process 500 may be performed by one or more other components of the symbol decoder 210. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

The symbol decoder 210 retrieves the binary symbol stream from the memory buffer 204 (502). The symbol decoder 210 determines whether a length field is identified in the binary symbol stream (504). If the symbol decoder 210 does not identify a length field in the binary symbol stream (504), the symbol decoder 210 provides the binary symbols of the binary symbol stream to the second decode path 320 for decoding (506). If the symbol decoder 210 identifies a length field in the binary symbol stream (504), the symbol decoder 210 extracts the number of consecutive binary symbols indicated by the length field from the binary symbol stream (508) and provides the extracted binary symbols to the first decode path 310 for decoding (510).

Figure 6:
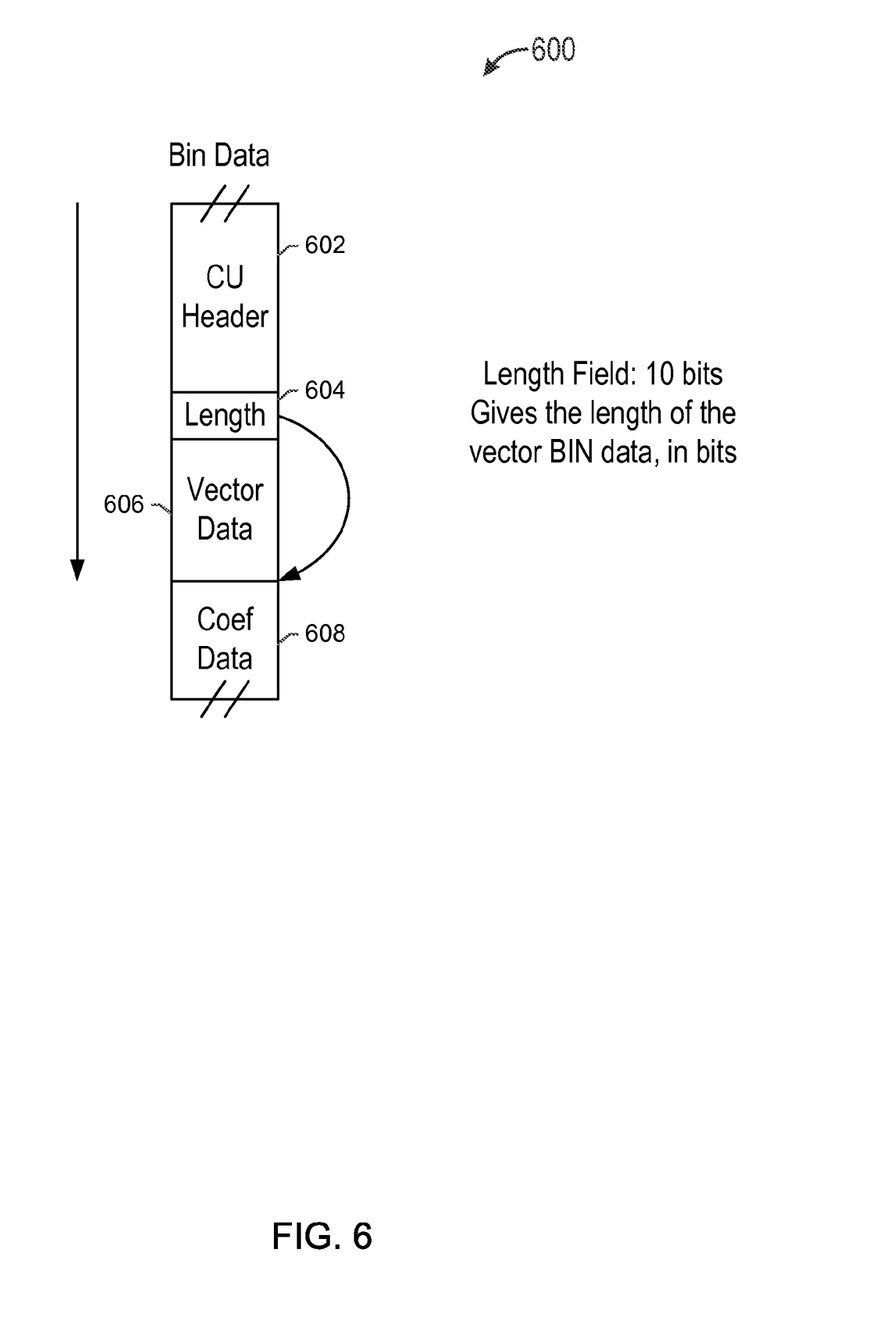
FIG. 6 illustrates an example binary symbol stream in accordance with one or more implementations.

FIG. 6 illustrates an example binary symbol stream 600 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The binary symbol stream 600 includes a coding unit header 602, a length field 604, binary symbols that include motion vector data 606 and binary symbols that include coefficient data 608. The length field 604 indicates the subsequent number of consecutive binary symbols that include the motion vector data 606. In this manner, the symbol decoder 210 can extract the binary symbols that include motion vector data 606 and provide the binary symbols that include the motion vector data 606 to the first decode path 310 for decoding while the binary symbols that include the coefficient data 608 are decoded by the second decode path 320. In one or more implementations, the binary symbol stream 600 may include multiple coding unit headers 602, length fields 604, binary symbols that include motion vector data 606 and binary symbols that include coefficient data 608.

Figure 7:
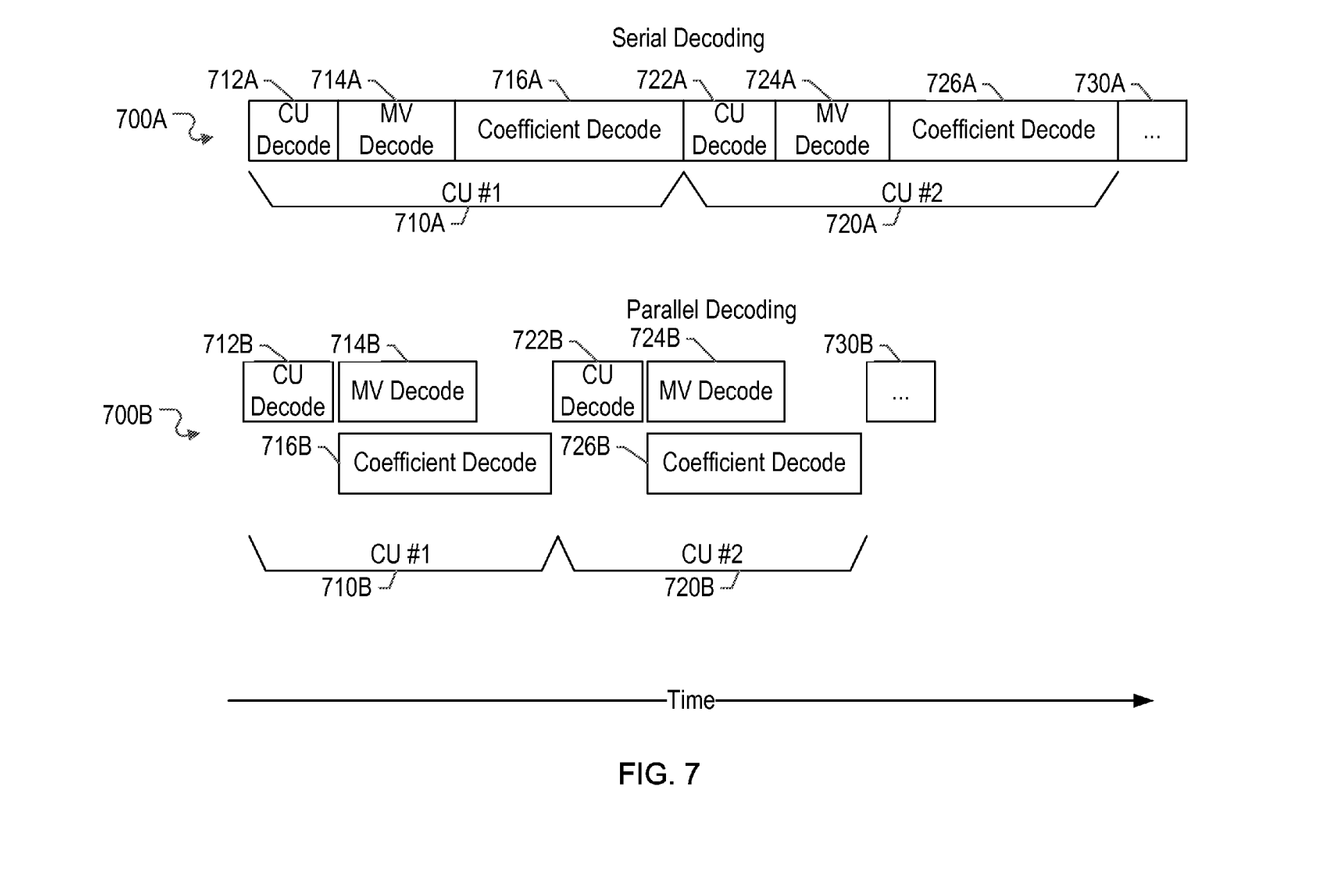
FIG. 7 illustrates an example timing diagram for serial symbol decoding and an example timing diagram for parallel symbol decoding in accordance with one or more implementations.

FIG. 7 illustrates an example timing diagram for serial symbol decoding 700A and an example timing diagram for parallel symbol decoding 700B in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example timing diagram for serial symbol decoding 700A illustrates the serial symbol decoding of a first coding unit 710A, a second coding unit 720A, and other compressed image data 730A. The example timing diagram for parallel symbol decoding 700B illustrates the parallel symbol decoding of a first coding unit 710B, a second coding unit 720B, and other compressed image data 730B. The first coding units 710A, 710B are labeled differently for explanatory purposes; however, the first coding units 710A, 710B contain the same contents. Similarly, the second coding units 720A, 720B are labeled differently for explanatory purposes; however, the second coding units 720A, 720B contain the same contents. Lastly, the other compressed image data 730A, 730B are labeled differently for explanatory purposes; however, the other compressed image data 730A, 730B contain the same contents.

The first coding units 710A, 710B include coding unit header decodes 712A, 712B, motion vector decodes 714A, 714B, and coefficient decodes 716A, 716B. The second coding units 720A, 720B include coding unit header decodes 722A, 722B, motion vector decodes 724A, 724B, and coefficient decodes 726A, 726B. As shown in FIG. 7, when using serial symbol decoding, each of the binary symbols is decoded in serial, e.g. one-by-one. However, by using parallel symbol decoding, multiple binary symbols can be decoded in parallel, e.g. substantially simultaneously. For example, the motion vector decode 714B can be performed by the first decode path 310 while the coefficient decode 716B is performed by the second decode path 320. Thus, as illustrated in FIG. 7, the parallel symbol decoding provided by the subject system allows the first and second coding units 710B, 720B to be decoded in significantly less time than serial symbol decoding.

Figure 8:
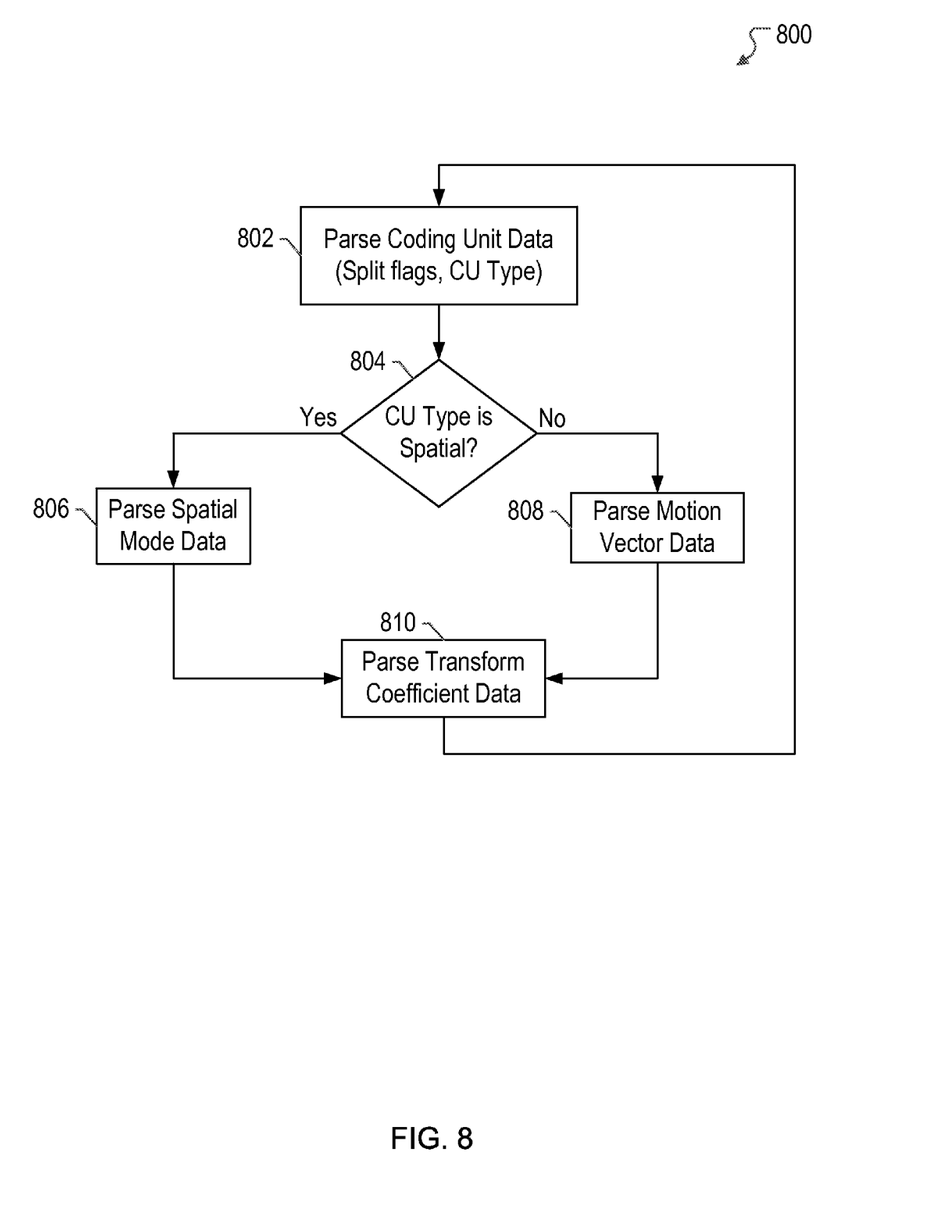
FIG. 8 illustrates a flow diagram of an example process for parsing a coding unit in accordance with one or more implementations.

FIG. 8 illustrates a flow diagram of an example process 800 for parsing a coding unit in accordance with one or more implementations. For explanatory purposes, the example process 800 is described herein with reference to the CABAC block 202 of FIG. 2; however, the example process 800 is not limited to the CABAC block 202 of FIG. 2, and the example process 800 may be performed by one or more other components of the decoder 200. Further for explanatory purposes, the blocks of the example process 800 are described herein as occurring in serial, or linearly. However, multiple blocks of the example process 800 may occur in parallel. In addition, the blocks of the example process 800 need not be performed in the order shown and/or one or more of the blocks of the example process 800 need not be performed.

The CABAC block 202 receives an encoded bitstream containing coding units and parses coding unit data, such as split flags, coding unit (CU) types, etc. from the bitstream (802). The CABAC block 202 determines whether the parsed CU type indicates that the coding unit includes spatial data (804). If the CABAC block 202 determines that the parsed CU type indicates that the coding unit includes spatial data (804), the CABAC block 202 parses information from the bitstream that corresponds to spatial mode data (806). If the CABAC block 202 determines that the parsed CU type does not indicate that the coding unit includes spatial data (804), the CABAC block 202 parses information from the bitstream that includes motion vector data (808). After parsing information that includes spatial mode data (806) or motion vector data (808), the CABAC block 202 parses information from the bitstream that includes transform coefficient data (810). The CABAC block 202 repeats this process for the entirety of the bitstream. In this manner, the CABAC block 202 can determine where motion vector data starts and ends in the bitstream and/or the binary symbol stream, and can therefore insert the length fields into the binary symbol stream corresponding to the motion vector data.

Figure 9:
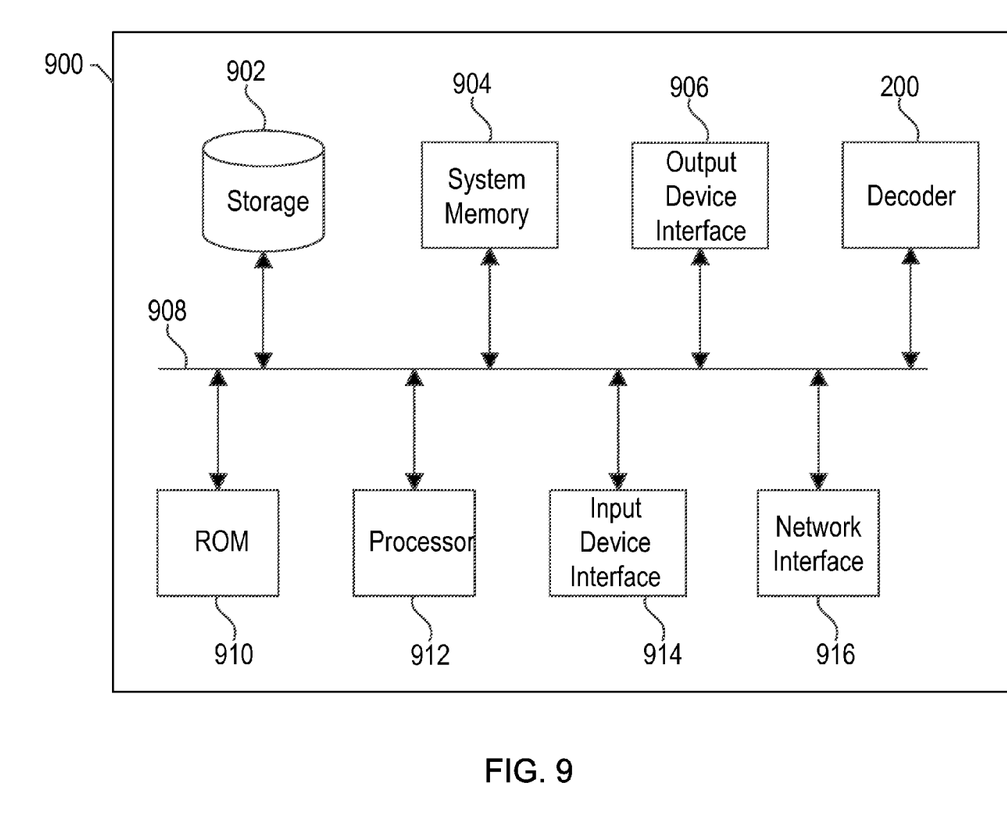
FIG. 9 conceptually illustrates an electronic system with which one or more implementations of the subject technology may be implemented.

FIG. 9 conceptually illustrates an electronic system 900 with which one or more implementations of the subject technology may be implemented. The electronic system 900, for example, can be a desktop computer, a laptop computer, a tablet computer, a server, a switch, a router, a base station, a receiver, a phone, a personal digital assistant (PDA), or generally any electronic device that transmits signals over a network. The electronic system 900 may be, and/or may include one or more components of, the electronic device 120. Such an electronic system 900 includes various types of computer readable media and interfaces for various other types of computer readable media. The electronic system 900 includes a bus 908, one or more processing unit(s) 912, a system memory 904, a read-only memory (ROM) 910, a permanent storage device 902, an input device interface 914, an output device interface 906, one or more network interfaces 916, such as local area network (LAN) interfaces and/or wide area network interfaces (WAN), and a decoder 200 or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations. In one or more implementations, the decoder 200 may be a hardware decoder.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to a network (not shown) through one or more network interfaces 916, such as one or more LAN interfaces and/or WAN interfaces. In this manner, the electronic system 900 can be a part of a network of computers, such as a LAN, a WAN, an Intranet, or a network of networks, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, race-track memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A decoder device comprising:
   a first decoder circuit configured to decode a received bitstream into a stream of binary symbols corresponding to motion vector data and other compressed image data, to reserve space in the stream of binary symbols to insert length fields, to insert the length fields into the stream of binary symbols, each of the length fields being determined by the first decoder circuit and being indicative of a number of consecutive binary symbols that correspond to the motion vector data, and to store the stream of binary symbols in a buffer, wherein the received bitstream is exclusive of the length fields; and
   a second decoder circuit configured to retrieve the stream of binary symbols from the buffer, to determine, based at least in part on the inserted length fields, consecutive binary symbols that correspond to the motion vector data, to decode the consecutive binary symbols that correspond to the motion vector data via a first decode path, and to decode the binary symbols that correspond to the other compressed image data via a second decode path that is independent of the first decode path, the second decoder circuit being collocated with the first decoder circuit in the decoder device.

2. The device of claim 1, wherein the second decoder circuit is configured to decode the consecutive binary symbols that correspond to the motion vector data via the first decode path in parallel with the binary symbols that correspond to the other compressed image data being decoded via the second decode path.

3. The device of claim 1, wherein the first decoder circuit is further configured to insert each of the length fields into the stream of binary symbols prior to the corresponding consecutive binary symbols that are indicated by each of the length fields.

4. The device of claim 3, wherein the second decoder circuit is further configured to:
   retrieve one of the length fields from the stream of binary symbols;
   extract the consecutive binary symbols indicated by the one of the length fields from the stream of binary symbols based at least in part on the one of the length fields; and
   decode the extracted consecutive binary symbols via the first decode path.

5. The device of claim 1, wherein the other compressed image data comprises at least one of spatial mode data or transform coefficients.

6. The device of claim 1, wherein the first decoder circuit comprises a context adaptive binary arithmetic decoder (CABAC) circuit.

7. The device of claim 1, wherein the second decoder circuit comprises a symbol decoder circuit.

8. The device of claim 1, wherein:
   the first decode path comprises a first alignment circuit and a first symbol decoder circuit; and
   the second decode path comprises a second alignment circuit and a second symbol decoder circuit that is physically distinct from the first symbol decoder circuit.

9. The device of claim 8, wherein the first symbol decoder circuit is configured to transmit a first symbol size to the first alignment circuit to update a first bit position of the first alignment circuit and the second symbol decoder circuit is configured to transmit a second symbol size to the second alignment circuit to update a second bit position of the second alignment circuit.

10. The device of claim 9, wherein the first alignment circuit is configured to update a first bit position based at least in part on the first symbol size and the second alignment circuit is configured to update a second bit position based at least in part on the second symbol size.

11. The device of claim 1, wherein the first decoder circuit comprises on-chip memory that is configured to store the number of the consecutive binary symbols until a length of the number of consecutive binary symbols is determined and inserted as one of the length fields.

12. A method for parallel symbol decoding, the method comprising:
   converting a bitstream into a stream of binary symbols, wherein the binary symbols comprise motion vector data and other compressed image data;
   determining a number of consecutive binary symbols in the stream that comprise motion vector data;
   inserting, at a decoder device, a length field into the stream of binary symbols prior to the consecutive binary symbols that comprise the motion vector data, wherein the length field indicates the number of the consecutive binary symbols in the stream that comprise the motion vector data and the bitstream is exclusive of the length field;
   providing the stream of binary symbols to a first decode path;
   extracting, by the decoder device, the number of consecutive binary symbols indicated by the length field from the stream of binary symbols upon identifying the length field in the stream of binary symbols; and
   providing the extracted number of consecutive binary symbols to a second decode path that is separate from the first decode path.

13. The method of claim 12, wherein the converting, the determining and the inserting are performed by a first decoder circuit and the providing the stream of binary symbols, the extracting, and the providing the extracted number of consecutive binary symbols are performed by a second decoder circuit that is distinct from the first decoder circuit.

14. The method of claim 13, further comprising:
storing, by the first decoder circuit, the stream of binary symbols in a memory; and
retrieving, by the second decoder circuit, the stream of binary symbols from the memory.

15. The method of claim 12, wherein the stream of binary symbols are provided to the first decode path in parallel with the extracted number of consecutive binary symbols being provided to the second decode path.

16. A computer program product comprising instructions stored in a non-transitory computer-readable storage medium, the instructions comprising:
instructions for providing a stream of binary symbols to a first decode path, the stream of binary symbols comprising length fields that were inserted at a decoder device;
instructions for identifying one of the length fields in the stream of binary symbols while providing the stream of binary symbols to the first decode path;
instructions for extracting a number of consecutive binary symbols indicated by the one of the length fields from the stream of binary symbols before the number of consecutive binary symbols are provided to the first decode path; and
instructions for providing the extracted number of consecutive binary symbols to a second decode path that is separate from the first decode path.

17. The computer program product of claim 16, where the instructions further comprise:
instructions for converting a bitstream into the stream of binary symbols;
instructions for determining the number of the consecutive binary symbols in the stream that comprise motion vector data; and
instructions for inserting the length fields into the stream of binary symbols prior to the consecutive binary symbols.

18. The computer program product of claim 17, wherein the stream of binary symbols comprises the motion vector data and other compressed image data.

19. The computer program product of claim 18, wherein the motion vector data is decoded via the second decode path and the other compressed image data is decoded via the first decode path.

20. The computer program product of claim 16, wherein the stream of binary symbols are provided to the first decode path in parallel with the extracted number of consecutive binary symbols being provided to the second decode path.

* * * * *